Patented July 8, 1947

2,423,643

UNITED STATES PATENT OFFICE 2,423,643

CONDENSATION PRODUCTS OF GUANYL-UREA WITH ALKYLENE OXIDES

Walter P. Ericks, Buffalo, N. Y., assignor to American Cyanamid Company, New York, N. Y., a corporation of Maine No Drawing. Application April 22, 1943, Serial No. 484,077

2 Claims. (Cl. 260—553)

This invention relates to the preparation of new and useful condensation products of guanylurea and substituted guanylurea with alkylene oxides.

More particularly, it embraces the preparation of condensation products by reacting guanylurea with alkylene oxides such as ethylene oxide, glycidol or compounds capable of yielding an intermediate containing an alkylene oxide ring during the condensation reaction.

The guanylurea compounds embraced by this invention may be represented by the following general formula:

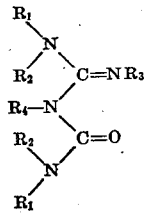

in which $R_1$, $R_2$, $R_3$ and $R_4$ are members of the group consisting of hydrogen, alkyl, aryl, aralkyl and alkylol groups and where at least one of the substituents $R_1$, $R_2$, $R_3$ and $R_4$ is an alkylol. The substituents $R_1$, $R_2$, $R_3$ and $R_4$ may be the same or different in the various compounds included within the scope of the invention and it should therefore be understood that each symbol is intended to represent any member of the group defined.

It is an object of this invention to prepare these compounds cheaply and efficiently. A still further object is to prepare surface active materials which find use as textile and leather assistants and in the paper, lacquer, resin, cosmetic and similar industries as highly effective wetting, emulsifying and detergent agents. The products of this invention are especially useful for softening purposes as well as anti-crease and wrinkle prevention in cloth, leather, fabricoid and similar materials and are particularly valuable when used as alkali and acid resistant wetting, detergent and emulsifying agents as well as for the resolution of emulsions such as petroleum-water emulsions. They also find use as mercerizing assistants. Further and more important uses are suggested in the following description.

With these objects in view and such others as may hereinafter appear, the invention consists in the novel products and processes described below and more particularly defined in the claims.

This case is a continuation-in-part application of Serial No. 376,618, filed January 30, 1941, by Walter P. Ericks, now Patent 2,320,225.

The compounds of this invention are prepared in general by reacting a substituted or unsubstituted guanylurea with a compound containing an ethylene oxide ring. If desired the reaction is accelerated by using a temperature of 150 to 200° C. and a suitable organic or inorganic base, preferably an alkali-metal or alkaline earth metal hydroxide such as sodium hydroxide, potassium hydroxide, calcium hydroxide, or pyridine and the like. Usually the reaction is exothermic and hence must be controlled as by the use of an efficient cooling-device. The reaction product can be purified by filtration, evaporation, and if necessary further purified by solvent extraction.

In place of a compound containing an alkylene oxide ring, an epihalogenhydrine may be used, or a similar substance having a radical which under the conditions of the reaction forms an intermediate having an alkylene oxide ring.

The following example illustrates the invention in more detail:

Example I

Ethylol guanylurea was prepared as follows: 33.8 g. of guanylurea sulfate dissolved in water at 28° C. was mixed with 11.2 g. of calcium hydroxide slurried in 50 cc. of water. This mixture was constantly stirred for 3 hours at about 10° C. with 8.8 g. of ethylene oxide. It was then reacted for an additional 3 hours, stirred and evaporated under reduced pressure. The reaction product was extracted several times with ethyl alcohol and the extracts evaporated to yield the desired product.

The product serves as an excellent softening agent for cotton, rayon and other cellulosic fibers and fabrics and has highly desirable emulsifying and detergent properties in acid solutions. It is also effective in resolving and breaking petroleum-water emulsions. The presence in this substituted guanylurea of an alkoxy and/or hydroxy group increases its solubility markedly in water and polar solvents.

In addition to ethylene oxide and glycinol, various other ethylene oxide ring compounds may be used, namely 1,2- and 1,3-propylene oxide, isobutylene oxide, tetramethylethylene oxide, n-hexyl-ethylene oxide as well as ethylene chlorohydrin, epichlorhydrin, chloroglycerol, their substitution products, and other compounds having a reactive ethylene oxide ring present or which are capable of forming an ethylene oxide ring in the course of the reaction. However, if the compound chosen for the reaction with guanylurea has a low boiling point, i. e., ethylene oxide, propylene oxide, and the like, it is advantageous to carry out the reaction in a closed system and under elevated pressure in order to avoid the loss of the reactants at the temperature at which the reaction takes place at a sufficiently rapid rate to make the process commercially feasible.

These condensation products obtained by reacting a compound containing an ethylene oxide ring and an unsubstituted guanylurea are of particular utility in the preparation of surface-active agents of the cation-active type. By substitution with alkyl, aryl, and aralkyl groups, the unsubstituted alkylol guanylureas above described acquire excellent surface active properties. For this reason they are well suited for wetting and softening wool, cotton, cellulose acetate, cellulose nitrate, viscose and similar materials. They are also useful in the emulsification of mineral oils, glycerides, fats, oils and the like. These compounds, more particularly the alkylol guanylureas, are useful anti-oxidants for oils and soaps, functioning as stabilizers in that they prevent rancidity and deterioration of liquid and solid soaps when incorporated therein. They find application in the formulation of printing inks, dye pastes, dye baths, leather preparations and flotation agents. By their use it is possible to secure fullness, resistance to unraveling, and increased wet strength in rayons and other fabrics. They reduce the tendency of treated cloth materials to wrinkle or crease.

These products, particularly those having waxy or paste-like properties are useful assistants in the textile, leather, paper, rubber, lacquer and similar industries.

The products described herein may be further reacted with an amine, either primary or secondary, or with a fatty acid to yield highly desirable and useful surface-active compounds.

In addition to the guanylureas above mentioned, various others may be condensed with the alkylene oxides. Further examples of substituted guanylureas include such as 1-methyl guanylurea, 3-methyl guanylurea, 4-methylguanylurea, 4-phenyl guanylurea, 4-methyl-phenyl guanylurea, guanyl thiourea, 4-methyl guanyl thiourea, 4-ethyl guanyl thiourea, 4-phenyl guanyl thiourea, 4-isobutyl guanyl thiourea, 4-allyl guanyl thiourea, 4-isoamyl guanyl thiourea, 4-phenylethyl guanyl thiourea, p-methoxyphenyl guanyl thiourea, p-ethoxyphenyl guanyl thiourea, and the like, each may be reacted and condensed with an alkylene oxide to give products having such desirable properties as those above described.

It is to be understood that the examples given above are merely specific embodiments and that the invention is not limited thereto, but is to be broadly construed within the scope of the appended claims.

I claim:

1. A method of preparing an ethylol guanyl urea which includes reacting guanyl urea and ethylene oxide at 10° C.

2. An ethylol guanylurea as produced by the method of claim 1.

WALTER P. ERICKS.

REFERENCES CITED

The following references are of record in the file of this patent:

UNITED STATES PATENTS

| Number | Name | Date |
|---|---|---|
| 2,059,273 | Piggott | Nov. 3, 1936 |
| 2,123,718 | De Groote | July 12, 1938 |
| 2,143,388 | Schlack | Jan. 10, 1939 |
| 2,155,328 | Paquin | Apr. 18, 1939 |
| 2,208,857 | Schlack | July 23, 1940 |

FOREIGN PATENTS

| Number | Country | Date |
|---|---|---|
| 432,356 | Great Britain | July 22, 1935 |

OTHER REFERENCES

Chem. Abst., vol. 20 (1926), pp. 716–17. (Copy in Pat. Off. Lib.)

Blair et al., Jour. Am. Chem. Soc. 49, 509–14 (1927). (Copy in Pat. Off. Lib.)